United States Patent
Shimono (10) Patent No.: US 10,647,273 B2
(45) Date of Patent: May 12, 2020

(54) BRAKE SYSTEM

(71) Applicant: TOYOTA JIDOSHA KABUSHIKI KAISHA, Toyota-shi, Aichi-ken (JP)

(72) Inventor: Masaru Shimono, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 38 days.

(21) Appl. No.: 16/159,963

(22) Filed: Oct. 15, 2018

(65) Prior Publication Data

US 2019/0161036 A1    May 30, 2019

(30) Foreign Application Priority Data

Nov. 28, 2017  (JP) .................................. 2017-227565

(51) Int. Cl.
| | |
|---|---|
| *B60T 8/1755* | (2006.01) |
| *B60T 17/22* | (2006.01) |
| *B60T 13/74* | (2006.01) |
| *G01L 5/28* | (2006.01) |
| *B60R 16/023* | (2006.01) |

(Continued)

(52) U.S. Cl.
CPC ............ *B60R 16/0232* (2013.01); *B60T 8/17* (2013.01); *B60T 8/1755* (2013.01); *B60T 8/267* (2013.01); *B60T 13/586* (2013.01); *B60T 13/662* (2013.01); *B60T 13/741* (2013.01);

(Continued)

(58) Field of Classification Search
CPC .... B60T 8/1755; B60T 8/17551; B60T 8/267; B60T 13/586; B60T 13/74; B60T 13/741; B60T 17/18; B60T 17/22; B60T 17/221; B60T 2270/40; B60T 2270/406;

(Continued)

(56) References Cited

U.S. PATENT DOCUMENTS

| | | | | |
|---|---|---|---|---|
| 5,962,931 A | * | 10/1999 | Maron | .................... B60T 13/74 303/122.04 |
| 6,902,241 B2 | * | 6/2005 | Yamamoto | ................ B60T 8/00 303/122 |

(Continued)

FOREIGN PATENT DOCUMENTS

| | | |
|---|---|---|
| DE | 102013013280 C5 * | 3/2019 |
| JP | 2015-098312 A | 5/2015 |

*Primary Examiner* — Thomas J Williams
(74) *Attorney, Agent, or Firm* — Sughrue Mion, PLLC (57) ABSTRACT

A brake system including: (a) a pair of electric brake devices respectively for right and left wheels; (b) a pair of individual controllers respectively associated with the electric brake devices; (c) a central controller communicable with the individual controllers; and (d) an on-vehicle network to which the central and individual controllers are connected, wherein the central controller transmits, via the on-vehicle network, control commands to the individual controllers as signals containing destination information of the respective individual controllers, wherein each individual controller controls an associated one of the electric brake devices according to the control command based on the signal containing the destination information of its own, and wherein the brake system further includes a position-change determining device configured to determine, based on a turning behavior of a vehicle, that positions of the individual controllers are mutually changed with respect to the association with the electric brake devices.

6 Claims, 4 Drawing Sheets

(51) Int. Cl.
  *B60T 13/58*  (2006.01)
  *B60T 13/66*  (2006.01)
  *B60T 8/26*   (2006.01)
  *B60T 8/17*   (2006.01)

(52) U.S. Cl.
  CPC ....... *B60T 17/221* (2013.01); *B60T 2270/406* (2013.01); *B60T 2270/413* (2013.01); *G01L 5/28* (2013.01)

(58) Field of Classification Search
  CPC ........... B60T 2270/413; B60T 2250/03; B60T 13/662; G01L 5/28; B60R 16/0232
  USPC ......................................... 303/9.61, 20, 146
  See application file for complete search history.

(56) References Cited

U.S. PATENT DOCUMENTS

| | | | |
|---|---|---|---|
| 6,991,302 B2* | 1/2006 | Nilsson | B60T 8/885 303/20 |
| 7,497,526 B2* | 3/2009 | Nilsson | B60T 8/885 303/189 |
| 9,207,136 B2* | 12/2015 | Cahill | G01L 5/28 |
| 2011/0029212 A1* | 2/2011 | Carresjo | B60T 17/22 701/70 |

* cited by examiner

BRAKE SYSTEM

CROSS REFERENCE TO RELATED APPLICATION

The present application claims priority from Japanese Patent Application No. 2017-227565, which was filed on Nov. 28, 2017, the disclosure of which is herein incorporated by reference in its entirety.

BACKGROUND

Technical Field

The following disclosure relates to a brake system installed on a vehicle.

Description of Related Art

An on-vehicle network as disclosed in Japanese Patent Application Publication No. 2015-98312 has been conventionally proposed. There are connected, to a bus of the network, individual controllers for controlling on-vehicle devices individually. In a vehicle equipped with the network, the individual controllers control the respective on-vehicle devices, by communication via the bus, such that the on-vehicle devices cooperate with one another. For executing such control, it is determined or confirmed in the disclosed on-vehicle network that appropriate individual controllers are connected to the network, utilizing authentication information of the respective individual controllers corresponding to the respective on-vehicle devices.

SUMMARY

In the meantime, there has been proposed a brake system in which electric brake devices are provided respectively for a right wheel and a left wheel and braking forces generated by the respective electric brake devices are controlled by individual controllers under control of a central controller. The on-vehicle network disclosed in the Publication described above is employable in such a system. In such a brake system, however, the following problem may arise. For instance, a case is considered in which the electric brake devices and the individual controllers are wrongly associated with each other in the brake system, namely, a case is considered in which the position of the individual controller for the right wheel and the position of the individual controller for the left wheel are mutually changed. When a braking force is intended to be given to one of the right and left wheels in such a case, the braking force is unintentionally given to the other of the right and left wheels. Thus, the brake system is not satisfactory in terms of utility. Accordingly, one aspect of the present disclosure relates to a technique of enhancing utility of a brake system in which a pair of electric brake devices respectively provided for a right wheel and a left wheel are controlled in a centralized manner employing an on-vehicle network.

One aspect of the present disclosure is directed to a brake system including: (a) a pair of electric brake devices respectively provided for a right wheel and a left wheel of a vehicle; (b) a pair of individual controllers respectively associated with the electric brake devices to respectively control the electric brake devices; (c) a central controller communicable with the individual controllers to control the electric brake devices in a centralized manner; and (d) an on-vehicle network to which the central controller and the individual controllers are connected, wherein the central controller is configured to transmit, via the on-vehicle network, control commands to the respective individual controllers as signals containing destination information of the respective individual controllers, wherein each of the individual controllers is configured to control an associated one of the electric brake devices according to the control command based on the signal containing the destination information of its own, and wherein the brake system further comprises a position-change determining device configured to determine, based on a turning behavior of the vehicle, that positions of the pair of individual controllers are mutually changed with respect to the association with the pair of electric brake devices.

Advantageous Effects

In the brake system according to the present disclosure, it is possible to easily determine or confirm, by the position-change determining device, a position change of the pair of individual controllers with respect to the association with the pair of electric brake devices (hereinafter simply referred to as a "position change of the controllers" where appropriate). In other words, it is possible to determine or confirm, by the position-change determining device, that one of the individual controllers that should be associated with the right wheel is wrongly associated with the left wheel and the other of the individual controllers that should be associated with the left wheel is wrongly associated with the right wheel. Thus, the brake system according to the present disclosure has high utility. The position-change determining device may be regarded as a device to confirm that the positions of the individual controllers are not mutually changed or a device to find or detect that the positions of the individual controllers are mutually changed.

Various Forms

The electric brake device of the brake system according to the present disclosure may have any suitable structure as long as the electric brake device is configured to generate a wheel braking force that depends on a force of an electric motor. For instance, the electric brake device includes: a rotation body that rotates together with a wheel; and a caliper holding a friction member and including an actuator configured to push the friction member onto the rotation body. In the case where the electric brake device is thus configured, the individual controller associated with the electric brake device may be disposed at any position in the vehicle. In view of ease of an installation work of the electric brake device and the individual controller on the vehicle, it is preferable that the electric brake device be attached to the caliper, specifically, to a main body of the caliper.

Each of the pair of individual controllers may be what is called an electronic control unit (ECU) including a computer and a driver for the actuator. Each individual controller controls an associated one of the pair of electric brake devices. The central controller has a function of controlling, in a centralized manner, the pair of electric brake devices via the pair of individual controllers. Like the individual controllers, the central controller may be what is called an electronic control unit (ECU) including a computer. The central controller may include a driver for another brake device different from the pair of electric brake devices and may also have a function of controlling another brake device. Further, the central controller may have a function of conducting an anti-lock brake control (ABS control) of each brake device, a function of executing a braking force control of each brake device in relation to stability of the vehicle (VSC control), and the like.

As the on-vehicle network through which the individual controllers and the central controller communicate, what is called a car area network or controllable area network (CAN) is employable, namely, there is employable a communication system in which the individual controllers and the central controller are connected to one bus and which does not require a controller that serves explicitly as a host. In the case where the CAN is employed, transmission of a signal from one controller to another controller is performed by transmitting a signal containing information that indicates a destination or an address of another controller, namely, a signal containing the destination information. Another controller as a recipient of the signal recognizes that the signal is intended to be sent thereto, based on the destination information.

Each controller may store identification information (ID information) of its own. For instance, when the controllers are connected to the on-vehicle network, the controllers may perform communication with one another so as to perform authentication with one another. The controllers may mutually set, as one another's destination information, one another's identification information when the authentication is performed. Explanation is given with regard to the brake system of the present disclosure. For instance, the identification information of each of the individual controllers may contain information indicating which one of the electric brake devices provided for the right wheel and the left wheel the individual controller controls. Based on the identification information of each individual controller, the central controller may set the destination information. By thus setting, the central controller can transmit, to each individual controller, a control command as to a braking force to be generated by the electric brake device that is ought to be associated with the individual controller, based on the identification information of the individual controller.

There will be explained a case in which the pair of electric brake devices and the pair of individual controllers are wrongly associated with each other. For instance, in the brake system in which the individual controllers are attached to the corresponding calipers as described above, there is considered a situation in which the caliper (to which the individual controller is already attached) for the right wheel is wrongly installed on the left wheel or a situation in which the caliper (to which the individual controller is already attached) for the left wheel is wrongly installed on the right wheel. In such a situation, even if the central controller transmits the control command to the individual controller that is ought to be associated with the electric brake device of the right wheel with the intention to generate a braking force for the right wheel, the electric brake device of the left wheel generates a braking force. On the contrary, even if the central controller transmits the control command to the individual controller that is ought to be associated with the electric brake device of the left wheel with the intention to generate a braking force for the left wheel, the electric brake device of the right wheel generates the braking force. Thus, the position change of the controllers is caused due to the erroneous attachment of the calipers.

In the brake system according to the present disclosure, the position-change determining device is configured to determine the position change of the controllers. The position-change determining device may be provided as a different device separately from or independently of the central controller and the individual controllers. Alternatively, each of the central controller and the pair of individual controllers may function as the position-change determining device.

In the brake system according to the present disclosure, the position-change determining device is configured to determine the position change of the controllers based on the turning behavior of the vehicle. The turning behavior of the vehicle means a motion of the vehicle in which an orientation of a body of the vehicle changes toward the right or the left during running. The position-change determining device is configured to determine the position change of the controllers based on a direction in which the orientation of the vehicle body changes and a degree of the turning behavior. In the case where the vehicle is equipped with a yaw rate sensor, the turning behavior may be estimated based on a yaw rate detected by the yaw rate sensor. In the case where the vehicle is equipped with wheel speed sensors to detect rotation speeds of the respective right and left wheels, the turning behavior may be estimated based on a difference between the rotation speed of the right wheel and the rotation speed of the left wheel detected by the wheel speed sensors.

The turning behavior may be obtained in a state in which the vehicle is actually driving on a road surface. Alternatively, the turning behavior may be obtained using what is called a brake tester, namely, using a device to simulate an actual driving condition of the vehicle by rotating the wheels on rollers without actually driving the vehicle. When the turning behavior for determining the position change of the controllers is obtained, especially, when the turning behavior is obtained by actually driving the vehicle, it is preferable to consider an operation amount of a steering operation member and to exclude the turning behavior arising from a steering operation on the steering operation member, for the purpose of obtaining only the turning behavior arising from the applied braking force.

A case is considered in which the positions of the individual controllers are mutually changed with respect to the right and left wheels, namely, a case is considered in which the position change of the controllers described above occurs. In such a case, when the central controller intends to give a braking force by the electric brake device only for one of the right and left wheels and transmits the control command to the individual controller that ought to be associated with the one of the right and left wheels, a braking force is given only to the other of the right and left wheels. That is, the direction of the turning behavior of the vehicle becomes opposite. Based on the fact that the direction of the turning behavior is opposite, it may be determined that the positions of the individual controllers are mutually changed.

For instance, a vehicle is considered in which the pair of electric brake devices are provided for one of the front wheels and the rear wheels and another brake device, which is configured to give braking forces individually to the right wheel and the left wheel, is provided for the other of the front wheels and the rear wheels. In such a vehicle, it is preferable to obtain the turning behavior of the vehicle such that a braking force is given to one of the right wheel and the left wheel which are the one of the front wheels and the rear wheels while a braking force is given to the other of the right wheel and the left wheel which are the other of the front wheels and the rear wheels. That is, it is preferable to obtain the turning behavior of the vehicle by executing a diagonal braking-force generating control for generating the braking forces only for diagonal wheels. (The diagonal wheels are two of the four wheels positioned diagonally.) By thus obtaining the turning behavior of the vehicle, the vehicle drives relatively safely even when the vehicle is actually driving because the turning behavior of the vehicle does not substantially occur as long as the individual controllers are appropriately associated with respect to the electric brake device for the right wheel and the electric brake device for the left wheel. On the contrary, in the case where the positions of the individual controllers are mutually changed, there occurs a relatively large turning behavior, making it possible to easily determine the position change of the individual controllers.

In the brake system in which the pair of electric brake devices are provided for one of the front wheels and the rear wheels and another brake device is provided for the other of the front wheels and the rear wheels, another brake device in question is preferably a hydraulic brake device. The electric brake device has an advantage of a good response, namely, an advantage that a time lag between a time point when a command to generate a braking force is generated and a time point when the braking force is actually generated is short, enabling the actual braking force to appropriately follow a target braking force. On the other hand, the hydraulic brake device has an advantage of high reliability. Thus, both of the advantages are ensured in the brake system in which the pair of electric brake devices are provided for the one of the front wheels and the rear wheels and the hydraulic brake device is provided for the other of the front wheels and the rear wheels. In this case, the hydraulic brake device that can generate a relatively large braking force is provided preferably for the front wheels while the electric brake devices are provided preferably for the rear wheels.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
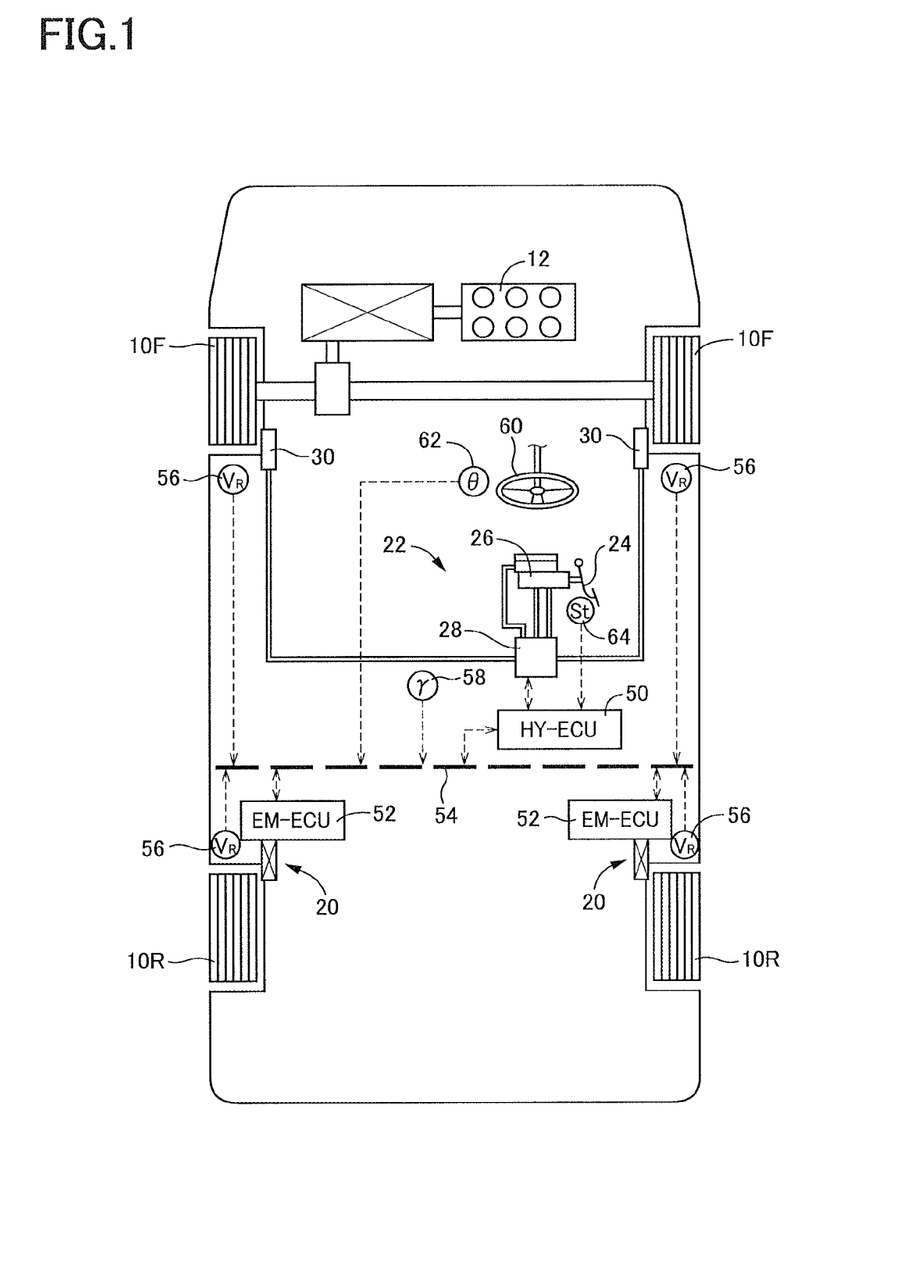
FIG. 1 is a schematic view showing an overall structure of a brake system according to one embodiment.

Referring to the drawings, there will be explained below in detail a brake system according to one embodiment of the present disclosure. It is to be understood that the present disclosure is not limited to the details of the following embodiment but may be embodied based on the forms described in Forms of the Invention and may be changed and modified based on the knowledge of those skilled in the art.
[A] Structure of Brake System As shown in FIG. 1, a vehicle on which a brake system according to the present embodiment is installed includes front right and left wheels 10F and rear right and left wheels 10R. The front wheels 10F are driving wheels to be driven by an engine 12. The brake system includes: a pair of electric brake devices 20 respectively provided for the rear right and left wheels 10R; and a hydraulic brake device 22, as another brake device, provided for the front right and left wheels 10F.

The hydraulic brake device 22 has an ordinary known structure. The hydraulic brake device 22 includes: a master cylinder 26 to which a brake pedal 24, as a brake operation member, is connected; a brake actuator 28; and a pair of wheel brakes 30 respectively provided for the front right and left wheels 10F. Each wheel brake 30 includes: a disc rotor, as a rotation body, configured to rotate together with a corresponding one of the front wheels 10F; brake pads, each as a friction member, configured to be pushed onto the disc rotor; and a caliper holding the brake pads and including a hydraulic actuator configured to push the brake pads onto the disc rotor. The hydraulic actuator is configured to advance a piston by a pressure of a working fluid supplied to a wheel cylinder of the actuator, so as to push the brake pads onto the disc rotor. Each wheel brake 30 is configured to give, to the corresponding front wheel 10F, a braking force having a magnitude in accordance with the pressure of the working fluid. (The braking force will be hereinafter referred to as "hydraulic braking force" where appropriate.)

The brake actuator 28 includes a pump device as a high-pressure source and a pressure control device configured to control a pressure of the working fluid supplied from the pump device. In a normal condition, the working fluid pressurized by the master cylinder 26 is not supplied to the wheel brake 30. Instead, the working fluid which is supplied from the pump device and whose pressure is controlled by the pressure control device is supplied to each wheel brake 30. In the event of an electric failure of the hydraulic brake device 22, for instance, the working fluid from the master cylinder 26 is supplied to each wheel brake 30. The pressure control device is configured to control the pressures of the working fluid to be supplied to the respective right and left wheel brakes 30 independently of each other.

Figure 2A:
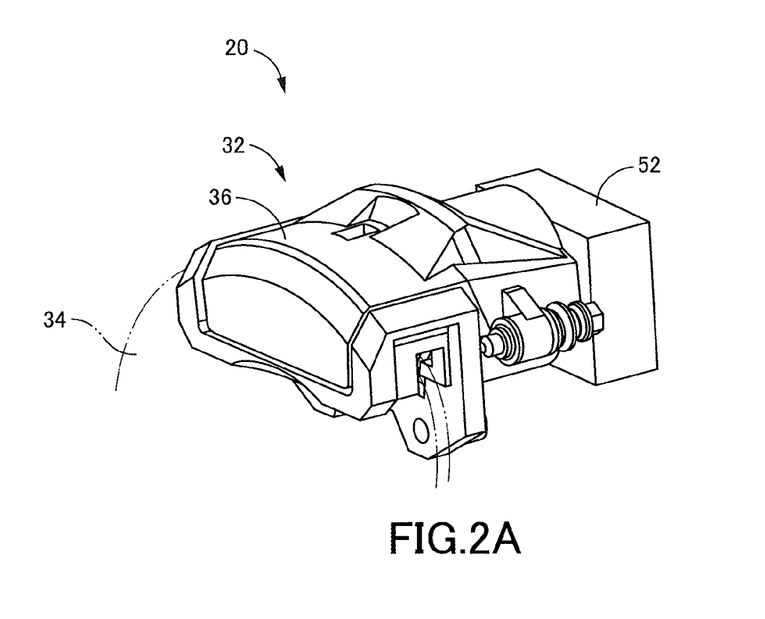
FIGS. 2A and 2B are perspective views of an electric brake device.
Figure 2B:
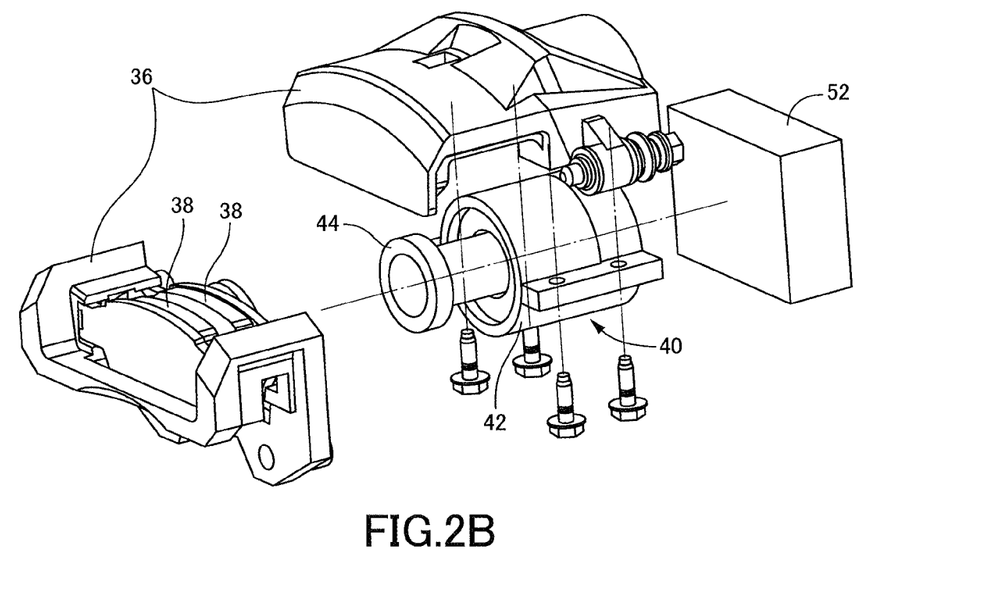

FIG. 2A shows one electric brake device 20 in a state before installed on the vehicle, and FIG. 2B shows a caliper 32 in a state before assembled. As apparent from FIGS. 2A and 2B, each electric brake device 20 includes: a disc rotor 34, as a rotation body, configured to rotate together with a corresponding one of the rear wheels 10R: and the caliper 32. The caliper 32 includes (A) a caliper main body 36, (B) a pair of brake pads 38 held by the caliper main body 36 with the disc rotor 34 sandwiched therebetween, each brake pad 38 functioning as a friction member, and (C) an electric actuator 40 fixed to the caliper main body 36 and configured to push the pair of brake pads 38 onto the disc rotor 34. The electric actuator 40 includes a housing 42. Though not illustrated, there are housed in the housing 42 (a) a piston 44 configured to advance and retract, (b) an electric motor as a drive source, and (c) a movement converting mechanism for converting a rotational movement of the electric motor into an advancing or a retracting movement of the piston 44. Each electric brake device 20 is configured to give, to a corresponding one of the rear wheels 10R, a braking force that depends on a force generated by the electric motor. (The braking force will be hereinafter referred to as "electric braking force" where appropriate.)

As shown in FIG. 1, the hydraulic brake device 22 of the present brake system is controlled by an electronic control unit 50 for the hydraulic brake device (hereinafter abbreviated as "HY-ECU 50" where appropriate.) The HY-ECU 50 includes a computer as a main constituent element and further includes drivers (drive circuits) for the pump device and the pressure control device of the brake actuator 28. Each of the electric brake devices 20 is controlled by a corresponding one of electronic control units 52 for the electric brake device (hereinafter referred to as "EM-ECU 52" where appropriate.) Each of the EM-ECUs 52 includes a computer as a main constituent element and further includes a driver (drive circuit) for the electric motor. As apparent from FIG. 2, each EM-ECU 52 is attached to the caliper main body 36 of the caliper 32 of the corresponding electric brake device 20 when the caliper 32 is assembled. The HY-ECU 50 and the pair of EM-ECUs 52 are connected to an on-vehicle network, specifically, to a CAN bus 54 that constitutes the on-vehicle network, and are communicable with one another.

More specifically, each of the EM-ECUs 52 controls the corresponding electric brake device 20 to which each EM-ECU 52 is attached. Thus, the pair of EM-ECUs 52 function as a pair of individual controllers. The HY-ECU 50 also has a function of controlling the pair of electric brake devices 20 via the pair of EM-ECUs 52 by communication through the CAN bus 54. That is, the HY-ECU 50 functions also as a central controller in the brake system. To the CAN bus 54, there are connected: wheel speed sensors 56 for respectively detecting rotation speeds $v_R$ of the respective wheels 10F, 10R, namely, wheel speeds $v_R$ of the respective wheels 10F, 10R; a yaw rate sensor 58 for detecting a yaw rate γ of the vehicle; an operation angle sensor 62 for detecting an operation angle θ of a steering wheel 60 as a steering operation member; and a stroke sensor 64 for detecting a brake operation stroke St which is an operation amount of the brake pedal 24. The brake operation stroke is a braking-force index indicative of a required braking force. The brake operation stroke will be hereinafter simply referred to as an "operation stroke" where appropriate.

Communication between the HY-ECU 50 and the pair of EM-ECUs 52 is performed as follows. (Each of the HY-ECU 50 and the EM-ECUs 52 is simply referred to as "ECU" where appropriate.) The ECUs are configured such that each ECU transmits, through the CAN bus 54, a signal containing destination information of another ECU to which the signal is intended to be transmitted and such that another ECU, as a destination indicated by the destination information, recognizes that the signal containing the destination information is a signal that should be received by itself.

In normal control of the braking force, the HY-ECU 50 determines, based on the operation stroke St of the brake pedal 24, a required overall braking force which is a braking force required by the vehicle as a whole. Based on the required overall braking force, the HY-ECU 50 determines a target hydraulic braking force which is the hydraulic braking force to be generated by the hydraulic brake device 22 and target electric braking forces which are the electric braking forces to be generated by the respective electric brake devices 20, such that the required overall braking force is distributed into the target hydraulic braking force and the target electric braking forces according to a set braking force distribution. The HY-ECU 50 feedback controls the pump device and the pressure control device of the brake actuator 28 of the hydraulic brake device 22 based on the pressure of the working fluid supplied to each wheel brake 30, such that the hydraulic braking force becomes equal to the target hydraulic braking force.

The HY-ECU 50 transmits the control commands for the respective EM-ECUs 52, namely, commands as to the target electric braking forces for the respective electric brake devices 20, as signals respectively containing the destination information indicating the respective electric brake devices 20 as the destinations. Each of the EM-ECUs 52 controls the electric braking force of an associated one of the electric brake devices 20, based on the signal indicating itself as the destination. Specifically, each EM-ECU 52 feedback controls a supply current to the electric motor based on a pushing force of the brake pads 38 onto the disc rotor 34, such that the electric braking force to be generated by the associated electric brake device 20 becomes equal to the target electric braking force.

In the present brake system, there is executed a vehicle stability control (VSC control), namely, a control in which a posture of the vehicle in turning becomes an appropriate posture in accordance with a vehicle running speed and the operation angle of the steering wheel 60. In this control, for generating a difference between the braking forces to be given to inside wheels located on the inner side of the vehicle when the vehicle turns and the braking forces to be given to outside wheels located on the outer side of the vehicle when the vehicle turns, the hydraulic braking forces to be generated by the respective wheel brakes 30 of the hydraulic brake device 22 and the electric braking forces to be generated by the respective electric brake devices 20 are individually controlled based on the yaw rate detected by the yaw rate sensor 58. In the brake system, there is further executed an antilock brake control (ABS control). In this control, the braking force to be given to each of at least one locked wheel, which at least one locked wheel is identified based on the wheel speeds of the respective wheels detected by the respective wheel speed sensors 56, is controlled based on the wheel speed of each of the at least one wheel. In the vehicle stability control and the antilock brake control, the HY-ECU 50 individually controls the hydraulic braking forces generated by the respective wheel brakes 30 of the hydraulic brake device 22 and transmits the individual control commands to the respective EM-ECUs 52 so as to individually control the electric braking forces generated by the respective electric brake devices 20.

[B] Position Change of Individual Controllers and Determination of Position Change As explained above, each of the EM-ECUs 52, as the individual controllers, is attached to the caliper main body 36 of the corresponding caliper 32, so that the EM-ECUs 52 are respectively associated with the calipers 32, namely, associated with the electric brake devices 20 that include the calipers 32. Each of the EM-ECUs 52 stores therein identification information (ID information) of its own. The identification information of each EM-ECU 52 contains information of the corresponding electric brake device 20 with which each EM-ECU 52 is ought to be associated, namely, information about with which one of the right and left electric brake devices 20 each EM-ECU 52 is ought to be associated.

The EM-ECUs 52 are attached to the calipers 32 of the associated electric brake devices 20, and the electric brake devices 20 are thereafter mounted on the corresponding rear wheels 10R. After the electric brake devices 20 are mounted, setting for communication between the HY-ECU 50 and the pair of EM-ECUs 52 is made. In the setting, the ECUs transmit the identification information of their own to one another, and each ECU sets the destination information of other ECUs based on the mutually transmitted identification information. Specifically, the HY-ECU 50 recognizes with which one of the rear right and left wheels 10R each EM-ECU 52 is ought to be associated and sets the destination information for each EM-ECU 52. That is, the HY-ECU 50 sets to which one of the EM-ECUs 52 the control command is to be transmitted when the HY-ECU 50 controls the electric braking force to be generated by one of the electric brake devices 20.

For instance, the following situation is considered. That is, the EM-ECU 52 for controlling the braking force of the left rear wheel 10R (hereinafter referred to as "left ECU 52" where appropriate) is wrongly attached to the caliper 32 for the rear right wheel 10R (hereinafter referred to as "right caliper 32" where appropriate), and the EM-ECU 52 for controlling the braking force of the rear right wheel 10R (hereinafter referred to as "right ECU 52" where appropriate) is wrongly attached to the caliper 32 for the rear left wheel 10R (hereinafter referred to as "left caliper 32" where appropriate). Subsequently, the right caliper 32 is disposed for the rear right wheel 10R, and the left caliper 32 is disposed for the rear left wheel 10R. Another situation is considered. That is, although the right and left EM-ECUs 52 are appropriately attached to the right and left calipers 32, the right caliper 32 is wrongly disposed for the rear left wheel 10R and the left caliper 32 is wrongly disposed for the rear right wheel 10R. In both of the situations, the pair of EM-ECUs 52 are wrongly associated with the pair of electric brake devices 20, namely, the right and the left are reversed in the association of the EM-ECUs 52 with respect to the electric brake devices 20. In other words, the position change of the EM-ECUs 52 occurs.

In the case where the setting described above is made in a state in which the positions of the EM-ECUs 52 are mutually changed, the HY-ECU 50 cannot recognize the position change of the EM-ECUs 52. Thus, in the position-changed situation, even if the HY-ECU 50 transmits the signal for giving the braking force to the rear right wheel 10R, the EM-ECU 52 wrongly associated with the electric brake device 20 of the rear left wheel 10R recognizes that the control command is transmitted to itself. As a result, the EM-ECU 52 in question controls the electric brake device 20 provided for the rear left wheel 10R to generate the braking force based on the control command transmitted thereto. Similarly, in the position-changed situation, even if the HY-ECU 50 transmits the signal for giving the braking force to the rear left wheel 10R, the EM-ECU 52 wrongly associated with the electric brake device 20 of the rear right wheel 10R recognizes that the control command is transmitted to itself. As a result, the EM-ECU 52 in question controls the electric brake device 20 provided for the rear right wheel 10R to generate the braking force based on the control command transmitted thereto. Such phenomena are problematic especially in the vehicle stability control and the antilock brake control described above.

In the present brake system, therefore, the braking force is actually generated in the vehicle after the setting has been made, and it is determined, based on the turning behavior of the vehicle in this instance, whether or not the positions of the individual controllers are mutually changed. Specifically, to determine whether or not the positions of the individual controllers are mutually changed, the HY-ECU 50 executes a position-change determining program indicated by a flowchart of FIG. 3 during a test run of the vehicle.

Figure 3:
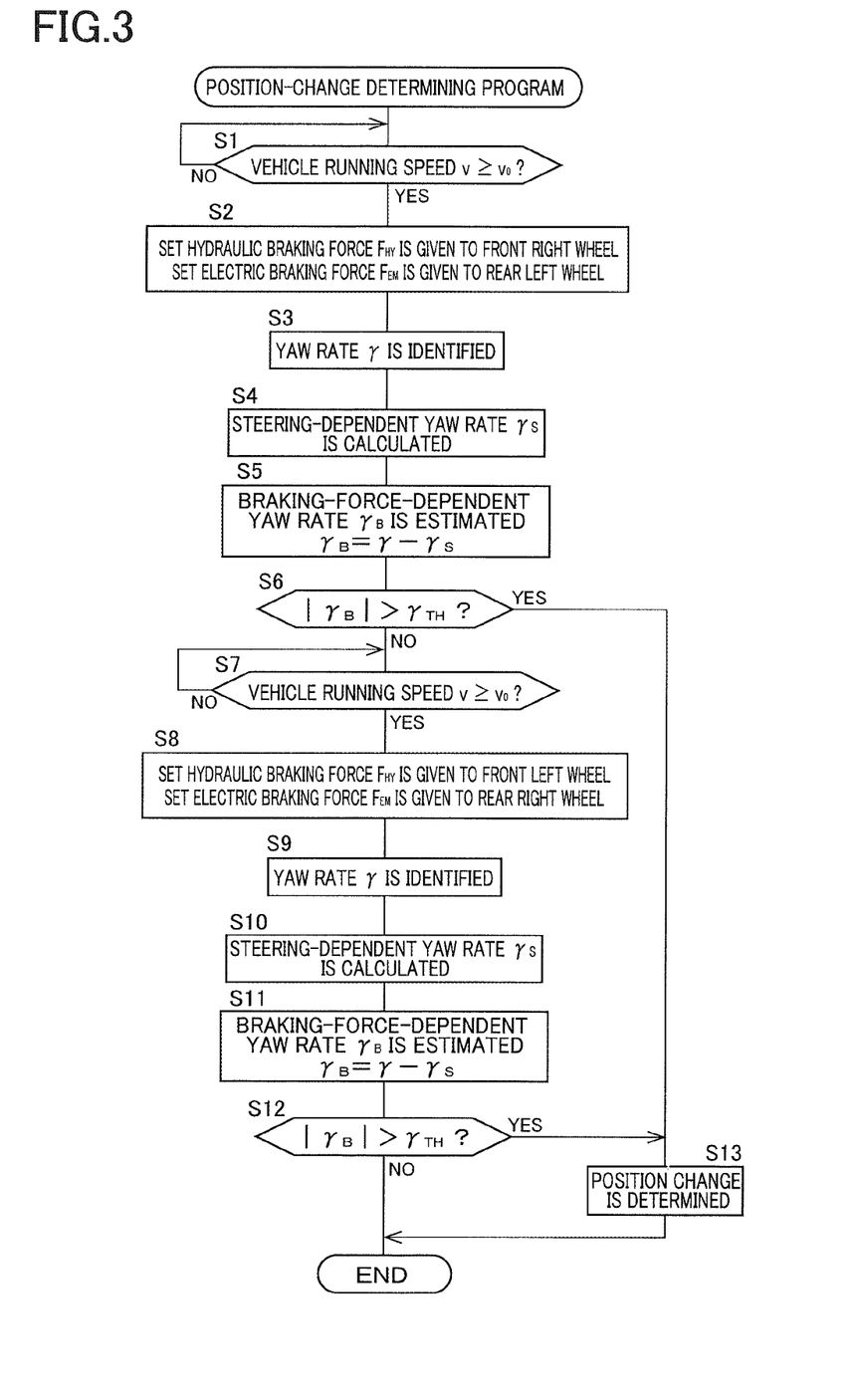
FIG. 3 is a flowchart showing a position-change determining program executed, in an electronic control unit for a hydraulic brake device as a central controller, for determining a position change of a pair of electronic control units (each as an individual controller) for respective electric brake devices with respect to association with a pair of electric brake devices.

The process according to the position-change determining program starts to be executed in a running state of the vehicle. The program starts with Step 1. (Step 1 is abbreviated as "S1", and other steps are similarly abbreviated.) At S1, it is determined whether a vehicle running speed v is not less than a set speed $v_0$. The vehicle running speed v is obtained from the wheel rotation speeds of the respective four wheels 10F, 10R detected by the respective wheel speed sensors 56. When the vehicle running speed v is not less than the set speed $v_0$, the control flow goes to S2 at which a set hydraulic braking force $F_{HY}$ is given to the front right wheel 10F by the hydraulic brake device 22 while a set electric braking force $F_{EM}$ is given to the rear left wheel 10R by the electric brake device 20 of the rear left wheel 10R. Specifically, the HY-ECU 50 itself controls the hydraulic brake device 22 based on the set hydraulic braking force $F_{HY}$ and further transmits the control command for generating the set electric braking force $F_{EM}$ to the EM-ECU 52 which is ought to be associated with the electric brake device 20 of the rear left wheel 10R. The EM-ECU 52 as a recipient of the transmitted control command controls the electric brake device 20 with which the EM-ECU 52 in question is associated, and the associated electric brake device 20 causes the rear wheel 10R for which the electric brake device 20 is provided to generate the set electric braking force $F_{EM}$. That is, the process at S2 is a control process for giving the braking forces to only two diagonal wheels which are located diagonally among the four wheels 10. Accordingly, the braking force control in the process may be referred to as a diagonal braking-force generating control. It is noted that the set hydraulic braking force $F_{HY}$ and the set electric braking force $F_{EM}$ are substantially the same value.

At S3, the yaw rate γ detected by the yaw rate sensor 58 is identified. At S4, based on the operation angle θ of the steering wheel 60 of the operation angle sensor 62 and the vehicle running speed v, a steering-dependent yaw rate $γ_S$ is calculated. Here, the steering-dependent yaw rate $γ_S$ is a yaw rate that is expected to be generated based on the steering. At S5, the steering-dependent yaw rate $γ_S$ is subtracted from the detected yaw rate γ to estimate a yaw rate that depends on generation of the braking force, namely, a braking-force-dependent yaw rate $γ_B$. The yaw rate is an index indicative of a degree of the turning behavior of the vehicle. Thus, at S5, the turning behavior of the vehicle that depends on the braking force is estimated based on the detected yaw rate γ and in consideration of the operation amount of the steering wheel 60.

Figure 4A:
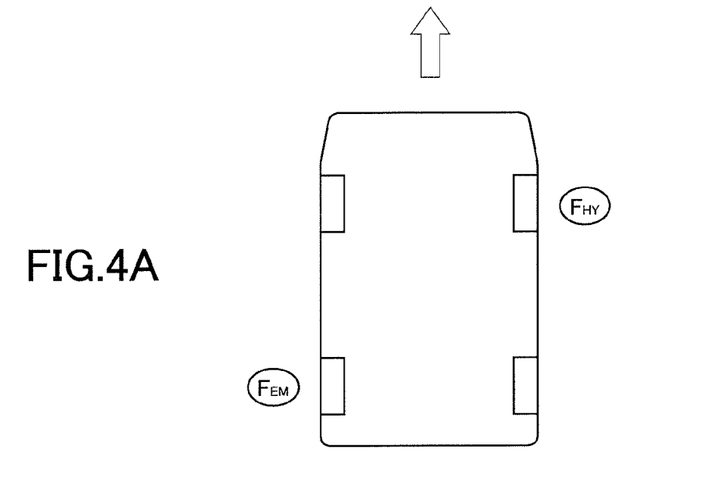
FIGS. 4A and 4B are conceptual views each for explaining a turning behavior of a vehicle in a process of determining the position change of the individual controllers.
Figure 4B:
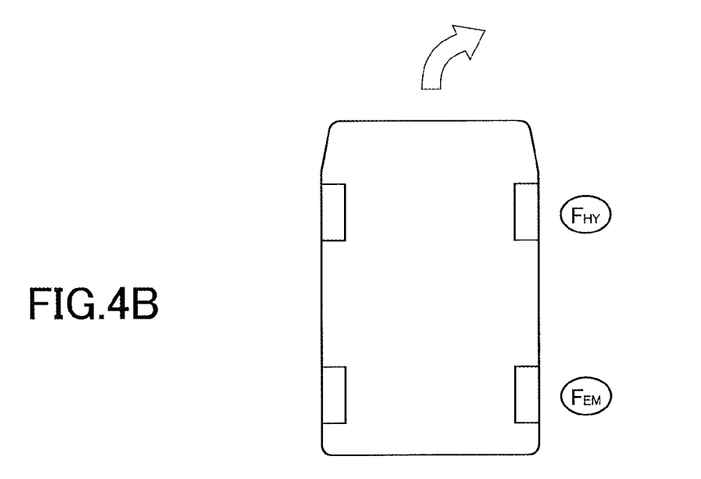

The following explanation will be given on the assumption that the steering wheel 60 is not being operated. The vehicle travels straight ahead as shown in FIG. 4A because the set hydraulic braking force $F_{HY}$ which is the hydraulic braking force given to the front right wheel 10F and the set electric braking force $F_{EM}$ given to the rear left wheel 10R are substantially the same value. That is, the vehicle does not substantially show the turning behavior. In the case where the positions of the right and left EM-ECUs 52 are mutually changed, however, the set hydraulic braking force $F_{HY}$ is given to the front right wheel 10F, and the set electric braking force $F_{EM}$ is given to the rear right wheel 10R. Accordingly, as shown in FIG. 4B. the vehicle shows a relatively large turning behavior directing rightward. In other words, the position change of the EM-ECUs 52 can be detected by the degree of the turning behavior of the vehicle.

To determine whether or not the positions of the EM-ECUs 52 are mutually changed based on the turning behavior of the vehicle, it is determined at S6 whether or not an absolute value of the braking-force-dependent yaw rate $γ_B$ estimated at S5 is beyond a set threshold yaw rate $γ_{TH}$ as a set degree. When the absolute value of the braking-force-dependent yaw rate $γ_B$ is beyond the set threshold yaw rate $γ_{TH}$, it is determined at S13 that the positions of the right and left EM-ECUs 52 are mutually changed, namely, the right and left EM-ECUs 52 are reversely associated with respect to the electric brake device 20, specifically, the right EM-ECU 52 is erroneously associated with the left electric brake device 20 while the left EM-ECU 52 is erroneously associated with the right electric brake device 20.

In the process according to the position-change determining program, even if it is determined at S6 that the absolute value of the braking-force-dependent yaw rate $\gamma_B$ is not beyond the set threshold yaw rate $\gamma_{TH}$, the process similar at S1-S6 is executed at S7-S12 for precautionary purposes. Specifically, the diagonal braking-force generating control is executed such that the braking forces are given only to the front left wheel 10F and the rear right wheel 10R. In this case, when it is determined at S12 that the vehicle shows the turning behavior beyond the set degree, it is determined at S13 that the positions of the right and left EM-ECUs 52 are mutually changed.

The HY-ECU 50, as the central controller, configured to execute the position-change determining program functions as a position-change determining device configured to determine, based on the turning behavior of the vehicle, that the positions of the EM-ECUs 52 as the individual controllers are mutually changed.

In the process according to the position-change determining program, the turning behavior of the vehicle is estimated by excluding the steering-dependent yaw rate $\gamma_S$ with consideration given to the influence of the steering. The turning behavior of the vehicle may be estimated otherwise. For instance, on condition that the operation angle θ detected by the operation angle sensor 56 is substantially 0, namely, on condition that the steering operation is not being made, the turning behavior of the vehicle may be estimated based on the yaw rate γ detected in this instance without considering the steering-dependent yaw rate $\gamma_S$.

What is claimed is:

1. A brake system comprising: (a) a pair of electric brake devices respectively provided for a right wheel and a left wheel of a vehicle; (b) a pair of individual controllers respectively associated with the electric brake devices to respectively control the electric brake devices; (c) a central controller communicable with the individual controllers to control the electric brake devices in a centralized manner; and (d) an on-vehicle network to which the central controller and the individual controllers are connected,
wherein the central controller is configured to transmit, via the on-vehicle network, control commands to the respective individual controllers as signals containing destination information of the respective individual controllers,
wherein each of the individual controllers is configured to control an associated one of the electric brake devices according to the control command based on the signal containing the destination information of its own, and
wherein the brake system further comprises a position-change determining device configured to determine, based on a turning behavior of the vehicle, that positions of the pair of individual controllers are mutually changed with respect to the association with the pair of electric brake devices.

2. The brake system according to claim 1,
wherein each of the electric brake devices includes: a rotation body configured to rotate together with a corresponding one of the right wheel and the left wheel; and a caliper holding a friction member and including an actuator configured to push the friction member onto the rotation body, and
wherein each of the individual controllers is attached to the caliper of a corresponding one of the electric brake devices.

3. The brake system according to claim 1,
wherein the pair of electric brake devices are provided for a right wheel and a left wheel which are one of front wheels and rear wheels of the vehicle, and another brake device is provided for a right wheel and a left wheel which are the other of the front wheels and the rear wheels of the vehicle,
wherein the central controller is configured to execute a diagonal braking-force generating control in which the central controller causes one of the electric brake devices corresponding to one of the right wheel and the left wheel to generate a braking force and causes said another brake device to generate a braking force for one of the right wheel and the left wheel which is positioned diagonally with respect to the one of the right wheel and the left wheel for which the one of the electric brake devices generates the braking force, and
wherein the position-change determining device is configured to determine that the positions of the individual controllers are mutually changed, based on the turning behavior of the vehicle during execution of the diagonal braking-force generating control.

4. The brake system according to claim 1,
wherein the vehicle includes a yaw rate sensor, and
wherein the position-change determining device is configured to determine that the positions of the individual controllers are mutually changed based on the turning behavior of the vehicle estimated based on a yaw rate detected by the yaw rate sensor.

5. The brake system according to claim 1, wherein the position-change determining device is configured to determine that the positions of the individual controller are mutually changed based on the turning behavior of the vehicle estimated in consideration of an operation amount of a steering operation member of the vehicle.

6. The brake system according to claim 1,
wherein each of the individual controllers stores identification information of its own that includes information indicating with which one of the electric brake devices the individual controller is ought to be associated, and
wherein the central controller is configured to set the destination information for each of the individual controllers based on the identification information of its own.

* * * * *